3,251,651
METHOD OF PREPARING CUBIC BORON PHOSPHIDE

Vlado I. Matkovich, Youngstown, N.Y., and James L. Peret, Milwaukee, Wis., assignors to Allis-Chalmers Manufacturing Company, Milwaukee, Wis.
No Drawing. Filed May 31, 1962, Ser. No. 198,757
16 Claims. (Cl. 23—204)

This invention relates to boron phosphide and more particularly, novel methods of preparing boron phosphides.

Boron phosphides have previously been prepared by reacting elemental boron and phosphorus in sealed silica tubes under 2–4 atomspheres phosphorus pressure and heating the reagents for a prolonged period of several hours.

The reaction was slow and inefficient and serious disadvantages resulted from the need to keep the system sealed. For example, if the seals were to fail even slightly, the phosphorus vapor would escape and the pressure would be lost.

The present invention is predicated upon the discovery that elemental boron and phosphorous, when combined in pressed pellets, may upon rapid heating, be formed into boron phosphide at standard pressure and without the need for elaborate sealing arrangements.

Accordingly, a prime object of the present invention is to provide a method of preparaing boron phosphide which is quickly and easily practiced at standard pressures, which obviates the prior requirement of a sealed system, which by simple temperature control may produce either cubic or rhombohedral boron phosphide and which provides a high quality boron phosphide product which is stable, chemically inert, suitable for use as abrasive material, and may be utilized to make shaped structures such as refractory articles, chemical apparatus, turbine blades combustion fittings, and the like.

These and still further objects which shall hereinafter appear are fulfilled by the present invention in a remarkable unexpected fashion as can be discerned from the consideration of the following detailed description of certain embodiments exemplifying the present invention.

In the practice of the present invention, as shall be hereinafter described in detail, depending upon the reaction temperature employed, both cubic boron phosphide (BP) and rhombohedral boron phosphide (identified in the art both as $B_6P$ and $B_{13}P_2$) may be formed.

Cubic boron phosphide is the stable low temperature phosphide and is formed by a reaction temperature of between 550° C. and about 1100° C. Above 1100° C. up to about 1450° C., both cubic boron phosphide and rhombohedral boron phosphide may be formed depending upon the duration of the heating of the reaction. Thus, if the heat is applied for more than just instantaneously, the reaction product will be substantially completely rhombohedral boron phosphide, cubic boron phosphide being a transitional state in this range.

Above about 1450° C., the reaction product is substantially completely rhombohedral boron phosphide. The reaction temperature of course should not reach the decomposition temperature of the phosphide which is somewhere above 2300° C. For practice purposes, 2300° C. is a reasonable upper limit, for at this temperature the reaction is instantaneous and additional heat would be wasted.

In one practice of the present invention a mixture of amorphous boron and read phosphorus was formed into pellets. The pellets were dropped into a crucible heated to 1,060° C. and flooded with an argon. The heat was immediately removed and the reaction product cooled. The reaction product was then washed with dilute nitric acid to remove any excess boron. X-ray analysis of the washed reaction product showed it to be cubic boron phosphide.

In another practice of the present invention a graphite crucible, surrounded by lampblack, is heated to 1650° C. A loose fitting cover is placed on the crucible and is provided with a carbon pipe to permit the egress of gases from the reaction zone and, as shall be described, to provide for the introduction of pellets into the hot reaction zone of the crucible. These pellets are about ¾ inch in diameter and weight about ten grams after having been pressed at 6800 pounds per square inch. Each pellet contains a 1:1 by weight mixture of amorphous boron and red phosphorus. The boron utilized was approximately 95–97% pure and the phosphorus was 99.9% pure.

The crucible is surrounded by an induction coil and heated to about 1600° C. The power is then turned off and the pellets are dropped into the heated crucible. The temperature during the dropping operation was noted to fluctuate between 1550° C. and 1650° C. When the desired number of pellets have been placed in the crucible, the furnace is reactivated to about 1600° C. to assure substantially instantaneous reaction resulting in the formation of a boron phosphide product which is substantially all rhombohedral. The loose crucible cover is all that is required to contain the reaction. The seals heretofore required are eliminated.

From the foregoing, it becomes apparent that boron phosphide is prepared by the rapid heating of the elements to the desired reaction temperature.

This effect is achieved either by heating pressed pellets from room to reaction temperature instantaneously, as with an induction coil, or by dropping the pellets into a reaction zone which has already been heated to the desired reaction temperature. In both instances, the desired reaction, with a normal charge, that is, about 10–20 grams, occurs significantly more rapidly, that is, in a matter of a few minutes, as compared with the prolonged heating required by the prior art systems.

Of course, a larger charge, on the order of 400 grams or more will take a little longer, that is, about an hour. The duration of a preselected charge is readily determinable by one skilled in the art having the present teaching at hand and, accordingly, further elaboration of this point is not believed necessary at this point.

Indeed, slow heating is expressly discouraged in the practice of the present invention since it will cause phosphorus to be lost as a vapor before any significant reaction occurs.

In the reactions described, the lower temperatures, that is, up to about 1100° C., causes cubic boron phosphide to form. The higher temperatures, that is, above about 1450° C., causes rhombohedral boron phosphide to form. In the intermediate range, that is, between about 1100° C. and about 1450° C., the resulting product is dependent upon the duration of heating with cubic boron phosphide being the first to form. Cubic boron phosphide will, upon exposure to additional heat at temperatures above about 1100° C., convert into rhombohedral boron phosphide.

In a preferred practice of the invention, the reaction is enveloped in an inert atmosphere such as argon, helium, and the like.

To further aid in the understanding of the present invention, and not as a limitation thereon, several exemplary heats are reported in Table I together with the X-ray analysis of the product formed.

Table I

| Heat No. | Molar, B:P | System | Temp. (C.) | X-Ray Anal. |
|---|---|---|---|---|
| 1 | 1:1 | r.h. | 1,550 | $B_{13}P_2$ vs; $BPO_4$ vw. |
| 2 | 13:4.7 | d.p. | 1,550 | $B_{13}P_2$ vs; C—vw. |
| 3 | 1:1 | r.h. | 1,180 | BP vs; $B_{13}P_2$ w. |
| 4 | 13:4.7 | d.p. | 1,180 | BP m; $B_{13}P_2$ w. |
| 5 | 1:1 | r.h. | 1,100 | BP vs. |
| 6 | 1:2 | r.h. | 1,100 | BP vs. |
| 7 | 13:4.7 | d.p. | 1,100 | BP m; B mw; $B_2O_3$ mw. |
| 8 | 1:2 | r.h. | 1,060 | BP vs. |
| 9 | 1:2 | d.p. | 950 | BP s. |
| 10 | 1:2 | d.p. | 750 | BP s. |
| 11 | 1:2 | d.p. | 550 | $BPO_4$ vs; BP vw. |

In the table, the following abbreviations are employed: r.h. rapid heating; d.p. dropping pellets; vs, very strong; m, medium; w, weak. Note that Heat Nos. 9, 10 and 11 were treated with dilute $HNO_3$ acid prior to X-ray analysis.

The present invention is described as occurring in graphite crucibles although it should be understood that graphite merely represents one material which is not reactive with the boron phosphide product in the temperatures indicated and yet will heat up when placed in the field of an induction coil.

Where the induction coil is not used, any heat resistant material which is inert to the reaction may be employed regardless of its response to the induction field.

Thus, boron phosphide can be made by a method which eliminates the sealed system heretofore deemed essential by the rapid heating of the admixed reactants and which provides a product in a remarkably shortened reaction period when compared to the extended durations heretofore considered as minimal.

From the foregoing, it becomes apparent that a method of preparing cubic boron phosphide has been described which achieves all of the aforestated objectives in a remarkable unexpected fashion. It is, of course, understood that the above description is presented to exemplify the present invention and is not intended as a limitation thereof since such modifications, alterations and applications as may readily occur to the skilled artist when confronted with this disclosure are intended within the spirit hereof, especially as it is defined by the scope of the claims appended hereto.

The embodiments of the invention in which an exclusive property or privilege is claimed are defined as follows:

1. The method of making boron phosphide comprising: introducing boron and phosphorous into and unsealed reaction zone; providing said reaction zone with a temperature of from about 550° C. up to about 2300° C. for a time of small duration but effective to form boron phosphide at normal pressure; and removing said heat from said zone.

2. The method according to claim 1 in which said reaction zone is preheated to said temperature.

3. The method according to claim 2 in which said boron and said phosphorus are introduced into said reaction zone as preformed pellets.

4. The method according to claim in which said reaction zone is filled with an inert gas.

5. The method according to claim 1 in which said reaction zone is inductively heated to said temperature after said boron and said phosphorus have been introduced thereinto.

6. The method according to claim 1 in which said boron and said phosphorus are amorphous boron and red phosphorus, respectively.

7. The method of making boron phosphide comprising: introducing boron and phosphorous into an unsealed reaction zone; rapidly applying heat to said reaction zone to heat said zone to a temperature of from about 550° C. up to about 2300° C.; momentarily maintaining said zone at said temperature; and removing said heat from said zone.

8. The method of making cubic boron phosphide comprising: introducing amorphorus boron and red phosphorus into an unsealed reaction zone; rapidly applying heat to said reaction zone to heat said reaction zone to a temperature of from about 550 up to about 1100° C.; and removing said heat from said reaction zone.

9. The method according to claim 8 in which said reaction zone is filled with an inert gas.

10. The method according to claim 8 in which said reaction zone is preheated to said temperature.

11. The method according to claim 10 in which said boron and said phosphorus are introduced into said reaction zone as preformed pellets.

12. The method of making rhombohedral boron phosphide comprising: introducing amorphous boron and red phosphorus into an unsealed reaction zone; rapidly applying heat to said reaction zone to heat said zone to a temperature of from about 1450° C. up to about 2300° C.; maintaining said zone at said temperature for a time of small duration but effective to form rhombohedral boron phosphide; and removing said heat from said zone.

13. The method according to claim 12 in which said reaction zone is filled with an inert gas.

14. The method according to claim 12 in which said reaction zone is preheated to said temperature.

15. The method according to claim 14 in which said boron and said phosphorus are introduced into said reaction zone as preformed pellets.

16. The method according to claim 12 in which said reaction zone is heated to said temperature substantially instantaneously by the application of induction heat thereto.

References Cited by the Examiner

UNITED STATES PATENTS 1,893,296  1/1933  Lilliendahl et al. _____ 23—204

FOREIGN PATENTS 628,232  9/1961  Canada.

OTHER REFERENCES

Popper et al., "Nature," Volume 179, page 1075 (1957).

BENJAMIN HENKIN, *Primary Examiner.*

MAURICE A. BRINDISI, *Examiner.*

G. OZAKI, M. WEISSMAN, *Assistant Examiners.*